3,324,590
METHOD FOR ERADICATING CERTAIN NOXIOUS
AND DANGEROUS INSECTS
Alan C. Richardson, Berkeley, Calif.
(215 Fremont St., San Francisco, Calif. 94119)
Filed Aug. 24, 1965, Ser. No. 482,129
2 Claims. (Cl. 43—131)

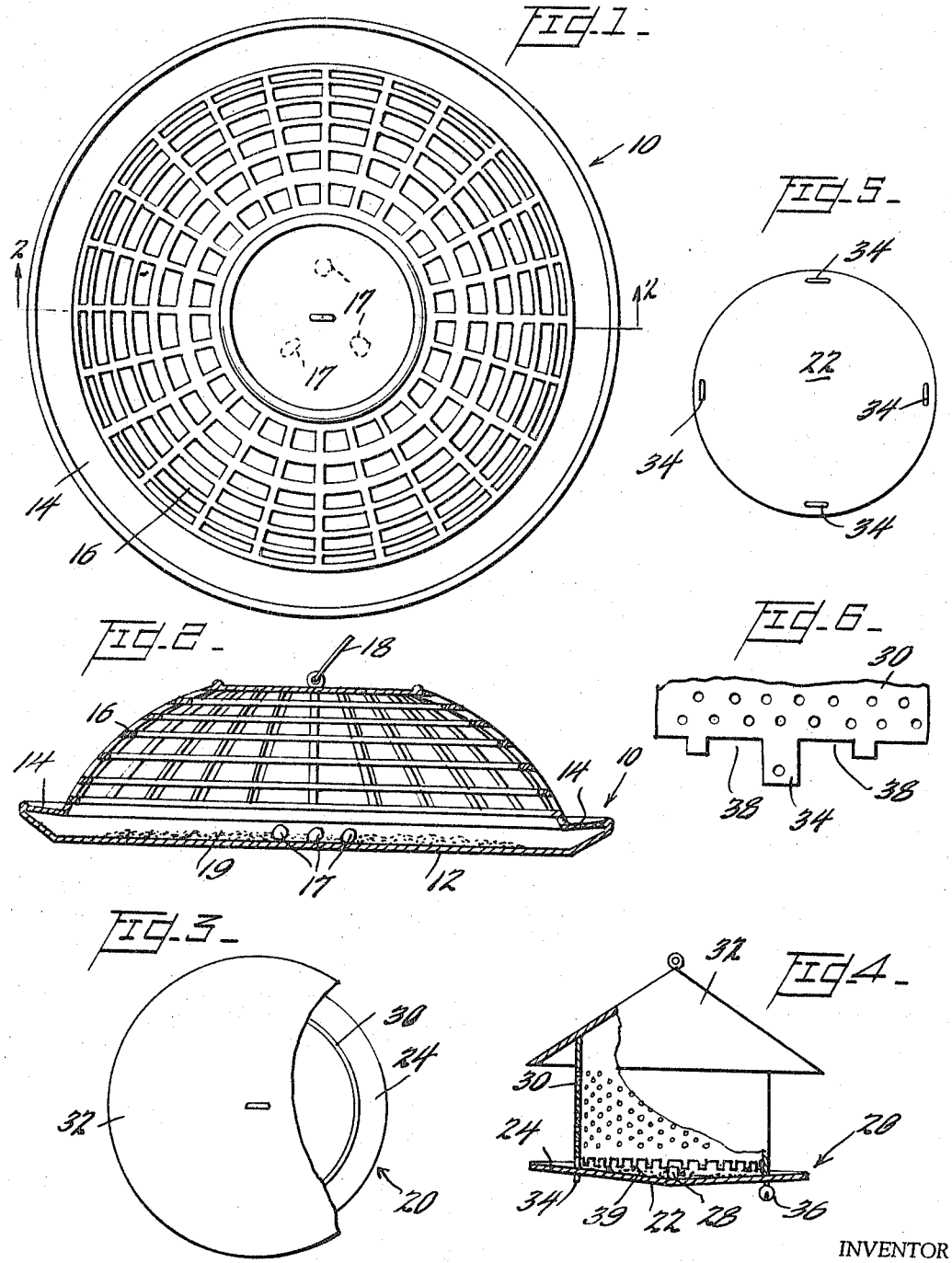

This invention as set forth in the following specification is a continuation-in-part of abandoned application No. 341,281 and relates to the art of insect extermination and has for its principal object the provision of a new and useful method for eradicating certain noxious and dangerous insects in a manner free of hazard to birds, mammals, and human beings and which is relatively unlikely to be destructive of benign insects such as honey bees.

More particularly, the present invention relates to the eradication of stinging, flying insects of the colonizing type such as wasps, hornets and the like.

The techniques currently in use for eradicating these noxious insects are outlined in Leaflet No. 365, issued by the U.S. Department of Agriculture; revised, October 1963.

Broadly, this method comprises locating the insects' nest and spraying it with an insecticide such as chlordane or DDT or burning it. The disadvantages associated with these methods are numerous.

First, locating the nests is a time-consuming and extremely difficult, if not impossible, task. Wasps and hornets construct their nests in trees, under eaves of buildings and underground, rendering them not only very difficult to locate at all but difficult to reach for burning or spraying even when located. Furthermore, the need for burning or spraying subjects one to the adverse effects of the pesticide as well as the danger of stinging by an aroused nest of insects.

Also, spraying the nest during the day will not exterminate those insects which happen to be away from the colony, and spraying at night during the inactive hours of the insects is rife with the obvious risks of working in the dark.

Generalized application of the pesticide to large areas, of woodland for example, is clearly not an acceptable solution by reason of the concurrent destruction of the benign or desirable types of insects with the noxious.

It is also known to exterminate these insects away from the nest by means of devices for trapping, poisoning and electrocuting. Considering the fact, however, that the nests house up to 30,000 and 40,000 insects, it is readily apparent that the extermination away from the nest of even several thousand insects will not eliminate the problem.

The present invention overcomes the attendant disadvantages of the prior art. Broadly, the process of the present invention comprises providing a dispensing arrangement so designed as to permit insects to crawl or walk but not fly into its interior and exclude birds and mammals. A bait or attractant desirably selected to preferentially attract noxious insects, is placed in the interior. A slow acting pesticide is so disposed in the dispenser as to adhere to the legs or other parts of the bodies of the insects as they approach the bait. Upon return to the nest, the insects spread the pesticide among the rest of the colony, eradicating the entire nest in a short time.

The advantages of this method over the practices of the prior art are numerous.

First, the tedious and time-consuming job of physically locating the nests is eliminated, thereby rendering the present process more efficient than prior art methods. According to the invention, the dispenser is merely placed at a point frequented by the insects, preferably out of the reach of children, pets, etc., and left there for several days. As the insects travel back and forth from the device to their nest, the pesticide is spread throughout the entire nest without the necessity of ever locating the nest at all.

Secondly, the necessity for spraying large quantities of toxic substances into trees, shrubs and onto buildings is eliminated thereby negating the possibility of harming other persons, wildlife, plants and benign insects. By the method of the present invention, only the noxious insects are attracted to the pesticide.

Thirdly, the process of the present invention necessarily results in the extermination of the entire colony. Whereas spraying the nest with chlordane or DDT will not eliminate those insects absent from the nest at the time of spraying, the spreading of a slow acting pesticide in the interior of the nest will soon lead to contamination of all of the insects upon their return to the nest.

FIGURE 1 is a plan view of a first embodiment of dispensing apparatus suitable for practicing the present invention;

FIGURE 2 is a vertical section on line 2—2 of FIGURE 1;

FIGURE 3 is a plan view of an alternative embodiment, a part of the cover being broken away;

FIGURE 4 is a side elevation of the device of FIGURE 3 with parts broken away;

FIGURE 5 is a plan view of the lower element of FIGURE 4; and

FIGURE 6 is a fragmentary elevation of the wall element of FIGURE 4.

FIGURES 1 and 2 illustrate one form of dispensing device which has been found highly effective as a means of carrying out the method of my invention. Since this structure can be made entirely out of combustible materials, it is especially well suited for use by laymen as it can be burned in toto after serving its purpose, thus eliminating any hazard from improper disposal. For more sophisticated and permanent use, a locked metal dispenser, such as that shown in FIGURE 3 of this application, is preferable.

As shown in FIGURE 1 the dispenser is made entirely of combustible materials such as waterproof paper or plastic. It consists generally of a plate-like structure 10 with a flat bottom 12 and gently sloping rim 14, on which is concentrically arranged in inverted position a reticulated bowl-shaped basket designated 16 having a maximum diameter somewhat smaller than that of plate 10.

The rim 14 of the plate extends externally of the basket 16 and provides a gently sloping annular surface or "flight deck" upon which flying insects can readily alight and take flight. A combustible but durable cord 18 is attached to the center of the structure so as to cause it to hang with the plate surface approximately horizontal. In use, the device is preferably hung under the eaves of a building about 8 to 10 feet above the ground to afford some protection from rain and wind while making it inaccessible to children or animals; or it can be placed inside a building if such building is infested by noxious insects.

The size of the openings or "meshes" of the reticulation are preferably larger in proximity to the flight deck, decreasing in the direction of the top of the inverted basket. This arrangement tends to encourage the insect to enter at the level of the flight deck so as to provide the maximum opportunity for contact with the insecticide.

FIGURES 3-6 illustrate a nondisposable-type unit of similar function for industrial use by professional exterminators or other qualified persons. This unit may be constructed of metal or other suitable material with interlocking parts so that it can be readily opened for cleaning and recharging. Its parts, functionally similar to those shown in connection with FIGURES 1 and 2, include the plate-like structure 20 comprising the bottom 22 of the enclosure, and having the exposed annular surface 24, the plate supporting the bait or attractant 28 in its approximate center. Additional features of the industrial-type device are a perforated wall 30 surmounted by a cone-shaped cover 32 to give protection against the elements and locking means comprising a clip 34 and a padlock 36 which are used in lieu of the integral assembly of the disposable unit of FIGURES 1 and 2. The lower edge of wall 30 adjacent the inner extremity of the flight deck is notched as at 38 to provide access openings for the insect. The purpose of the perforations 30 in wall 30 is for ventilation and light rather than for entry.

The size of the access openings in basket 16 or wall 30 should be limited to a dimension which will prohibit entrance therethrough by flying, thus forcing the insects to crawl or walk into the interior of the unit so as to ensure that they will come into contact with the insecticide. Accordingly, the openings, at their widest points, should be no larger than about ½ inch, with ⅜ inch being the preferred size. The minimum size, of course, is such as to allow easy entrance of the body of the insect with wings folded.

The radical thickness of contact annulus, i.e., the size of the ring of pesticide surrounding the bait should be sufficiently large to ensure sufficient contact between the insect's legs and the pesticide. A radius of approximately two inches will ordinarily suffice.

Any slow acting toxicant for noxious, colonizing, stinging insects may be employed in principle as the pesticide. The term "slow acting" is intended to mean that a significant period elapses between time of contact and time of death. An interval of approximately one to two hours has been found quite sufficient for the insect to return to the colony.

The preferred insecticides for purposes of this invention are the naphthyl-N-alkyl carbamates which may be represented by the general formula:

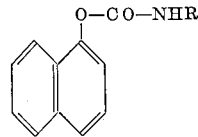

wherein R is an alkyl radical containing up to about ten carbon atoms.

Representative compounds are:

1-naphthyl N-methyl carbamate,
1-naphthyl N-ethyl carbamate,
1-naphthyl N-n-propyl carbamate,
1-naphthyl N-isopropyl carbamate,
1-naphthyl N-n-butyl carbamate,
1-naphthyl-N-isobutyl carbamate,
1-naphthyl N-pentyl carbamate,
1-naphthyl N-heptyl carbamate,
1-naphthyl N-n-octyl carbamate,
1-naphthyl N-2-ethylhexyl carbamate, and
1-naphthyl n-decyl carbamate, Especially good results have been obtained in practice with 1-naphthyl-N-methyl carbamate, which is available commercially under the trade names "Sevin" or "Carbaryl."

The insecticide may be employed in powder or liquid form. It may be used alone or in admixture with a carrier such as talc, to facilitate its adherence to the insects' legs and distribution within the feeder.

This compound is characterized by a high toxicity for insects but a very low toxicity for warm blooded animals coupled with a slow reaction time and is thus peculiarly well adapted to the needs of this invention. It will be certainly appreciated, however, that as other agents with comparable properties are discovered or are approved for general use by the appropriate governmental agencies, they can be substituted without departing from the scope of this invention.

The class of insects at which this invention is aimed have hairy legs to which the insecticide readily adheres on contact as occurs when they are made to walk or crawl through a bed of pesticide. It is not precisely understood how the insecticide is spread inside the nest to the remainder of the colony upon the return of the carrier insect. The preferred class of compounds mentioned above are known to function as cholinesterase inhibitors. In any event, treatment of just a few members of a colony in accordance with the present method has been found to completely exterminate the entire colony within a day or two.

The bait employed may be any substance which attracts wasps, hornets and the like with a minimum of attraction for benign insects such as honey bees. Meats have been found to be suitable attractants with liver gives particularly good results.

The following example illustrates the practice of the method of the present invention:

1-naphthyl-N-methylcarbamate in wettable powder form mixed with about 50% talc or a carrier or diluent in the interior of an apparatus similar to that depicted in FIGURE 1. The powder was distributed in a ring pattern, as hereinbefore described, around several pieces of liver. The apparatus was hung under the eaves of a building observed to be infested with wasps. After several days the wasps disappeared from the building and an examination of their nest revealed that the entire colony had been exterminated.

Having thus described my invention, what I claim is:

1. A method of eradicating stinging, flying insects of the colonizing type which comprises the steps of locating an enclosed zone in the environs frequented by said insects, placing an attractant for said insects within said zone, arranging in said zone a bed of 1-naphthyl N-methyl carbamate in powdered form, and providing a plurality of access openings to said zone contiguous to a side of said bed opposite from said attractant, said openings together substantially spanning said bed, each opening being larger than the average body size of the insects but substantially smaller than their wing span, whereby said insects are caused to pass through said openings by crawling and thus be brought in contact with said carbamate in said bed.

2. The method of claim 1 wherein said insecticide is disposed in a pattern surrounding said attractant.

References Cited

UNITED STATES PATENTS

| | | | |
|---|---|---|---|
| 1,700,517 | 1/1929 | Ross | 43—131 |
| 1,964,611 | 6/1934 | Watson | 43—131 |
| 3,009,855 | 11/1961 | Lambrech | 167—32 |

ALDRICH F. MEDBERY, *Primary Examiner.*

SAMUEL KOREN, *Examiner.*